United States Patent
Riedel et al.

(10) Patent No.: US 8,556,478 B2
(45) Date of Patent: Oct. 15, 2013

(54) ILLUMINATION DEVICE FOR SEVERAL PEOPLE IN AIRPLANES

(75) Inventors: Christian Riedel, Bliedersdorf (DE); Carsten Vogel, Hamburg (DE)

(73) Assignee: Airbus Operations GmbH (DE)

( * ) Notice: Subject to any disclaimer, the term of this patent is extended or adjusted under 35 U.S.C. 154(b) by 73 days.

(21) Appl. No.: 13/203,383

(22) PCT Filed: Jan. 19, 2010

(86) PCT No.: PCT/EP2010/050549
§ 371 (c)(1), (2), (4) Date: Aug. 25, 2011

(87) PCT Pub. No.: WO2010/097253
PCT Pub. Date: Sep. 2, 2010

(65) Prior Publication Data
US 2011/0305031 A1    Dec. 15, 2011

Related U.S. Application Data

(60) Provisional application No. 61/155,234, filed on Feb. 25, 2009.

(30) Foreign Application Priority Data

Feb. 25, 2009  (DE) .................. 10 2009 010 553

(51) Int. Cl.
*F21V 21/00*    (2006.01)
(52) U.S. Cl.
USPC .............. 362/471; 362/85; 362/231; 362/240

(58) Field of Classification Search
USPC ..................... 362/471, 240, 231, 85
See application file for complete search history.

(56) References Cited

U.S. PATENT DOCUMENTS

| | | | |
|---|---|---|---|
| 7,641,370 B2 | 1/2010 | Heine et al. | |
| 2003/0174499 A1* | 9/2003 | Bohlander | 362/240 |
| 2004/0183824 A1 | 9/2004 | Benson et al. | |
| 2006/0187081 A1* | 8/2006 | Gloisten et al. | 340/825.22 |
| 2007/0186477 A1 | 8/2007 | Stavaeus et al. | |
| 2007/0236926 A1* | 10/2007 | Guard et al. | 362/228 |
| 2008/0080197 A1 | 4/2008 | Heine et al. | |
| 2008/0112155 A1 | 5/2008 | Scown et al. | |
| 2008/0186721 A1 | 8/2008 | Vogel et al. | |

FOREIGN PATENT DOCUMENTS

| | | |
|---|---|---|
| DE | 19852998 A1 | 5/2000 |
| DE | 102006005523 A1 | 8/2007 |
| DE | 202006014933 U1 | 2/2008 |
| DE | 102007004829 A1 | 8/2008 |
| EP | 1002697 A2 | 5/2000 |
| GB | 2293443 A | 3/1996 |
| RU | 2187139 C2 | 8/2002 |
| RU | 2004108142 A | 8/2005 |

* cited by examiner

*Primary Examiner* — Ali Alavi
(74) *Attorney, Agent, or Firm* — Lerner, David, Littenberg, Krumholz & Mentlik, LLP

(57) ABSTRACT

The invention relates to a lighting device and a method for illuminating a projection area based on a plurality of different lighting patterns. The lighting unit is controlled based on lighting data, which are received from an external central system via an interface, or stored in a memory unit. In this way, a plurality of different lighting patterns can be realized, so that at least up to four reading lamps can be replaced by a single lighting unit.

11 Claims, 9 Drawing Sheets

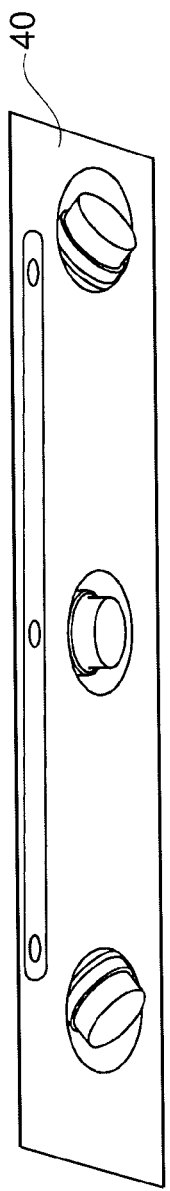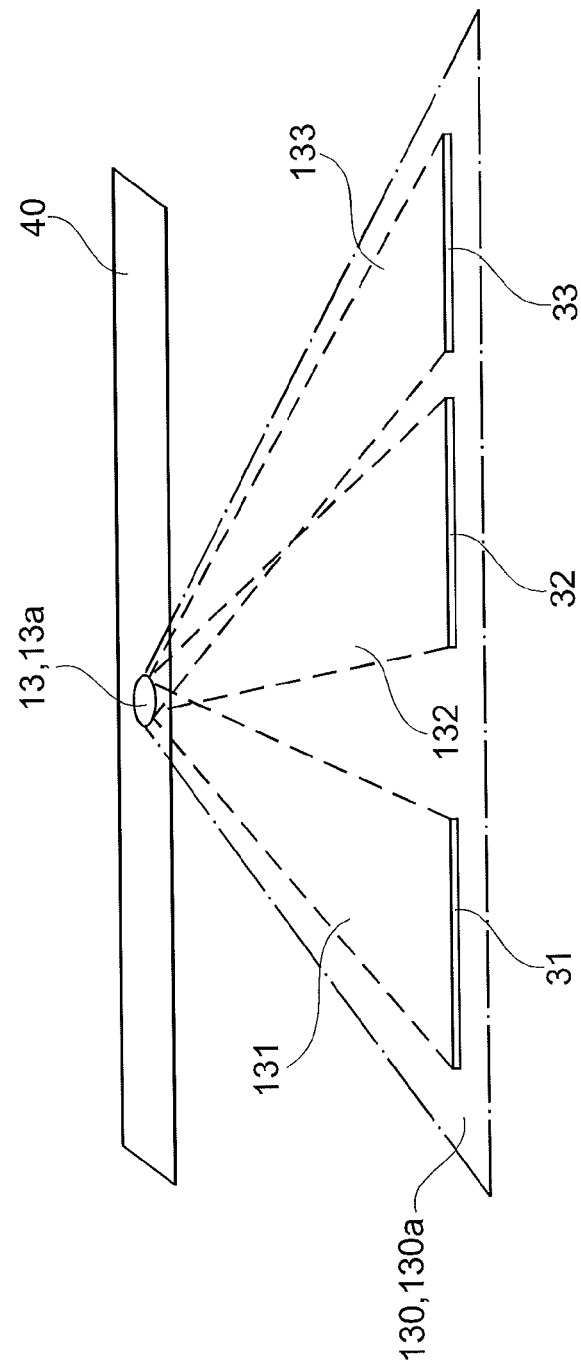

ILLUMINATION DEVICE FOR SEVERAL PEOPLE IN AIRPLANES

CROSS-REFERENCE TO RELATED APPLICATIONS

This application is a national phase entry under 35 U.S.C. §371 of International Application No. PCT/EP2010/050549, filed Jan. 19, 2010, published in German, which claims the benefit of the filing date of German Patent Application No. 10 2009 010 553.0 filed Feb. 25, 2009 and of U.S. Provisional Patent Application No. 61/155,234 filed Feb. 25, 2009, the entire disclosures of which are hereby incorporated herein by reference.

AREA OF THE INVENTION

The invention relates to a lighting device for a personal transport vehicle with a lighting unit designed for the varied, locally differentiated illumination of a projection area based on a plurality of different lighting patterns.

TECHNOLOGICAL BACKGROUND

In the area of personal transportation, in particular the lighting system in the equipment comprising the passenger compartment plays an important role with respect to the traveling comfort of passengers. In aircraft technology, the lighting units, such as reading lamps, are usually integrated into a control panel above each passenger seat, the so-called PSU (passenger service unit). The number of PSU's is very high in large aircraft. In particular given a great seating density, it is advantageous to provide compact arrangements to save on space, weight and cost.

The reading lamps are usually separate units, meaning that four to two reading lamps per PSU are installed above the passengers. The different reading lamps are aligned manually on the desired seat depending on the seating configuration. For example, if the class configuration changes during flight operations, the reading lamps must be realigned. The disadvantage to conventional lighting techniques in aircraft is that a variety of lamps, as a rule two to four, are necessary to provide each aircraft passenger with optimal lighting, for example for reading purposes. Combining several reading lamps into a single unit offers both a functional and weight advantage, since the high number of different functional units in the PSU ceiling channel can thereby be reduced. Therefore, it is desirable to find a solution for providing compact lighting units in conjunction with a comfortable and central alignment option.

According to Patent Specification US 2008/0112155, the elements in a PSU can be reduced by integrating a reading lamp into a personal air outlet by arranging an illuminated ring of LED's around the air nozzle. In order to align the ray of light for the individual passenger, the housing can be mechanically turned. While combining the air nozzles with the reading lamps cuts the number of elements to be built into the PSU in half, one lighting unit per passenger is still required.

SUMMARY OF THE INVENTION

The object of the invention is to provide an improved lighting unit that can replace a plurality of reading lamps, in such a way that various onboard situations can be illuminated in a locally differentiated manner.

The object is achieved by the subject matter of the independent claims. Additional embodiments are incorporated into the dependent claims.

The embodiments described below relate to the lighting device, the method and a corresponding computer program element, as well as to a computer-readable storage medium.

One exemplary embodiment provides a lighting device for a personal transport vehicle with a lighting unit, interface and control unit, wherein the lighting unit is designed for the varied, locally differentiated illumination of a projection area based on a plurality of different lighting patterns. The interface is here configured to receive lighting data from an external system, while the control unit is designed to activate the lighting unit with respect to the different lighting patterns based on the received lighting data.

In this way, a single lighting unit can be used to illuminate a plurality of seats. This elevates the functionality of the individual lighting unit, and thereby results in a cost and weight savings. At the same time, the assembly times for the lighting units can be reduced during the final assembly line (FAL), making it possible to further economize on costs. For example, four passengers can be provided with optimal illumination using the "single" lighting unit. An individual reading lamp can be used by just one passenger in a row of four seats without bothering any other fellow passengers.

The lighting data can encompass so-called image data and image control data. The different lighting patterns projected on the projection area can be transmitted in the form of image data or image files. For example, this makes it possible to generate pixel-based image files, which can depict a plurality of geometric elements, but also graphic symbols. The control unit can load these image data from an internal memory or from outside, and then convert them into lighting control data, for example. The lighting unit can illuminate the desired lighting patterns based on the lighting control data. The lighting patterns internally stored in the lighting device can be specifically tailored to the PSU unit. An internal memory of a lighting device above a row of two seats would encompass two circles or squares situated side by side as lighting patterns, for example.

In addition to the lighting control data for the lighting unit itself, the operating device can be controlled based on lighting control data received from outside via the interface. This makes it possible to centrally activate or deactivate various scenarios, such as eating, reading, sleeping or emergency situations, for several lighting devices.

The lighting data can be sent from an external system, for example the central cabin management system (CMS) to the control device. The lighting status of the lighting unit can further be relayed to the external system. This makes it possible to tailor the lighting patterns to the respectively required configurations. For example, when outputting the onboard menu, a switch can be made from a small lighting cone suitable for reading purposes to a larger lighting pattern tailored to the shape of a tray.

In addition, the reading lamps no longer have to be manually aligned on the passenger seat, since an external system transmits the lighting data adjusted to the respective seating to the control device of the lighting unit. For example, customer-specific adjustments, such as right/left (R/L), can take place without mechanical resources. As a whole, this enables a more flexible adjustment for the customer corresponding to the respective layout of the aircraft.

However, the lighting unit can also be set by the passenger. For example, this can take place by way of an individual control on the seat, which makes it possible to adjust the color, brightness or reading lighting status, and so on.

In another exemplary embodiment of the invention, the lighting device exhibits a memory unit configured to store a plurality of different lighting patterns, wherein the control unit is designed to use the received lighting data and stored lighting patterns as the basis for actuating the lighting unit.

For example, a memory unit can store suitable preferences or default settings of the lighting units for boarding, takeoff and landing times, but also for various seating configurations. The respective default settings can be called by the control unit. Any individual settings to the lighting units that might have been made can thereafter be reset again. As a result, the lighting device has a central reset option. In addition, a memo function can be used to store additional setting positions in memory to go along with the stored preferences.

The memory unit can be situated both in the lighting device and externally. The advantage to an external memory unit is that several lighting devices can resultantly be centrally controlled from a single memory in conjunction with a CPU (computer processing unit) or some other logic, like an FPGA (field programmable gate array). By contrast, an internal memory unit eliminates the need to transmit larger amounts of data relating to the different lighting patterns, and only requires the transmission of lighting control data.

In another exemplary embodiment of the invention, the control unit is designed to actuate a plurality of opening angles, directions (x, y, z), lighting intensity, colors and/or shapes of illumination.

In this way, the lighting can be specifically tailored to the customer or flight phase by varying the lighting intensity, angles or colors. For example, suitably dimming the light can create a moonlight scenario during the resting phase of the passengers. In addition, the opening angles can be adjusted as a function of the respective distances between the seats and lighting unit. In order to ensure the same lighting intensity on every seat in the row of seats regardless of the distance from the lighting device, the longest lighting cone can be adjusted to the corresponding intensity level. Further, effects like rectangular distortions can be avoided by suitably scaling the image data (keystoning).

In addition, the angles of incidence for the projection area along with other parameters can be fine-tuned. These fine adjustments can be centrally introduced via the cabin management system, or individually for each PSU unit. The optimal adjustment data can then be stored as configuration files in the memory unit.

In another exemplary embodiment of the invention, the control unit is designed to electronically actuate a plurality of different lighting cones.

In this way, even four or more adjacent seats can be serviced by a single lighting device, each having its own lights. The number of positions to be illuminated depends on the cabin layout, wherein the corresponding configuration files for the cabin can be retrieved by the control unit via the central cabin management system.

In another exemplary embodiment of the invention, the lighting patterns can be pixel-based image data.

In this way, any two-dimensional shape desired can be projected onto a seat or wall surface position in a locally differentiated manner. The shape of the adjustable lighting cone, e.g., polygonal, hexagonal, rectangular or circular, here depends only on the stored image file. For example, different lighting cones can be created by means of a raster scan process commonly used in laser projection technology.

In another exemplary embodiment of the invention, the lighting unit encompasses light sources from a group comprised of LED's, OLED's (organic light-emitting diodes), fiber optics, laser beams and gas discharge lamps.

Light-emitting diodes, abbreviated LED's, have a high potential in lighting technology. One of the characterizing features of LED's by comparison to conventional light sources is that they can be rapidly switched and modulated. White LED's can be used, as can LED's with the primary colors red, green and blue (RGB). In addition, compact, flat lighting units can be installed on the bottom of the luggage compartment in the form of LED's, which can do the job of up to four conventional lamps.

As an alternative, fiber optics can also be used for lighting purposes. A fiberglass cable with a suitable auxiliary optical system at the end enables a low installation depth and the installation of varied lighting patterns. This makes it possible to effectively save on costs and weight. Another advantage to fiber optics by comparison to conventional light bulbs and fluorescent tubes is that power lines are not required, and that the light piping can reflect the high safety standards placed on air travel. In addition, discharge lamps and laser technology can be combined with fiber optics.

Furthermore, different lighting patterns can be generated out of laser beams. As a result, a laser projector can write an image file onto any projection surface line by line. For example, the primary colors red, green and blue (RGB) can here be used, and their brightness modulated to set any colors desired. The line deflection of the lighting units here takes place at a speed not perceptible to the human eye. This gives each passenger the impression of continuous lighting.

In another exemplary embodiment of the invention, the lighting unit can exhibit a controllable lens system.

In this way, the light from the light source can be aligned in the desired directions, thereby generating a lighting cone that can illuminate the projection area, e.g., three reading planes, as homogeneously as possible with a defined brightness level. The lens system can here encompass a combination of lenses that are adjustable relative to each other. Further, the light from the light source can hit a flexible lens or diffusing panel. Servo systems for the lighting unit can also take the form of miniature deflection mirrors, e.g., which can deflect LED's in the x, y and z direction in relation to the different lighting patterns. The mentioned miniature servo systems can be electronically actuated, thereby eliminating the need to manually set the lamps.

In another exemplary embodiment of the invention, the lighting unit can exhibit an electronically actuatable filter.

For example, a white LED unit that illuminates an optical filter can be electronically actuated in this way. The optical filter setting required for the lighting patterns during aircraft operation are stored in the memory unit depending on the lighting surface, its alignment, color and intensity.

In another exemplary embodiment of the invention, the control unit can exhibit a multiplexing device designed to repeatedly actuate the lighting unit in relation to the different lighting cones.

Actuation in the multiplexing process is here comparable to line deflection in laser projectors. The line deflection of the lighting units takes place at frequencies of between about 50 and 200 Hz, which the human eye cannot perceive. In this way, each individual passenger is given the impression of continuous lighting.

In another exemplary embodiment of the invention, an aircraft with a lighting device can exhibit a system designed to output lighting data to the interface.

For example, information about which positions are to be illuminated can in this way be centrally relayed to the lighting devices via the cabin management system (CMS).

In another exemplary embodiment of the invention, a lighting method encompasses the following procedural steps:

Transmitting and receiving lighting data from an external system by way of an interface, actuating the lighting unit with respect to the different lighting patterns based on the received lighting data by means of a control unit, and illuminating a projection area with a lighting unit relative to the different lighting patterns based on a plurality of different lighting patterns.

The control unit can here transmit the lighting status to the external system, in order to at that location compare the status data with the required lighting patterns. If the status already satisfies the required configuration, this lighting unit will not have to be converted until the next reconfiguration.

Another exemplary embodiment of the invention provides a computer program element, which when configured by a processor is designed to implement the method according to the invention.

Another exemplary embodiment of the invention indicates a computer-readable storage medium, on which the computer program element is stored.

Let it further be noted that the above features or procedural steps can also be combined. Combining the above features or steps can also yield interacting effects and results that go beyond the individual impact of the corresponding features, even if this is not expressly described in detail.

Exemplary embodiments of the invention will be described below drawing reference to the following drawings.

BRIEF DESCRIPTION OF THE DRAWINGS

FIG. 1 shows a view of a PSU system in prior art.

FIG. 2 shows a lighting unit according to an exemplary embodiment of the invention for three adjacent seats.

DETAILED DESCRIPTION OF THE DRAWINGS

Figure 3A:
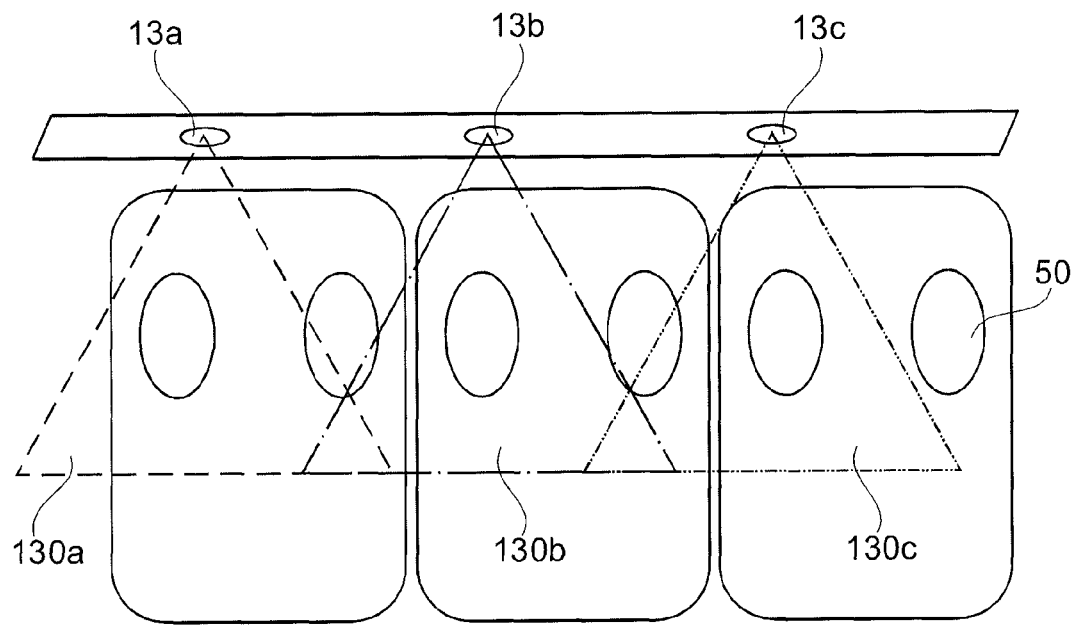
FIG. 3 shows a side view a) and top view b) of three single lighting units according to an exemplary embodiment for three rows of seats situated one in back of the other in an aircraft.

FIG. 1 shows the prior art, wherein three reading lamps are arranged in a PSU system. The outer reading lamps are outwardly directed, for example allowing them to better illuminate a window or aisle seat. To this end, the housing of the lighting unit can be manually turned. The individual passengers can use switches to turn the lamps on or off.

FIG. 2 shows a PSU unit with a lighting device according to the present invention, which is designed to optimally light three adjacent seats. The lighting unit 13 or 13a is integrated into the PSU channel 40. The cover area of the lighting unit encompasses the lighting cones 130 or 130a. The projection surfaces or reading planes are denoted on FIG. 1 by the trays 31, 32 and 33. These can each be individually illuminated by the lighting cones 131, 132 and 133 adjusted to the tray shape. Each lighting cone can here be individually turned on or off. The number of positions to be illuminated can be centrally controlled from a cabin management system.

Figure 3B:
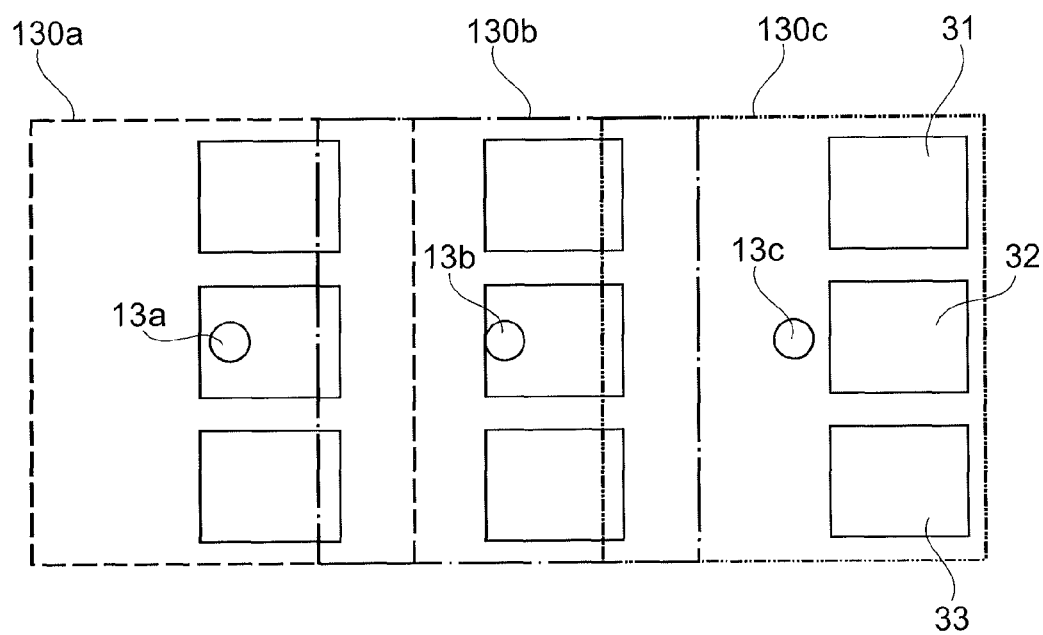

FIG. 3a shows a side view of three "single" lighting units according to an exemplary embodiment of the invention for an aircraft cabin. The rows of seats a, b and c situated one in back of the other are each allocated a single lighting unit 13a, 13b and 13c. The dashed lines represent the cover area or lighting cones 130a, 130b and 130c. As illustrated by the top view on FIG. 3b, a respective three seats and the accompanying trays 31, 32 and 33 are illuminated. The cover areas of the individual lighting cones 130a, 130b and 130c here overlap. For example, the suitable control data can be used to control the lighting units in such a way as to illuminate only the trays themselves.

Figure 4:
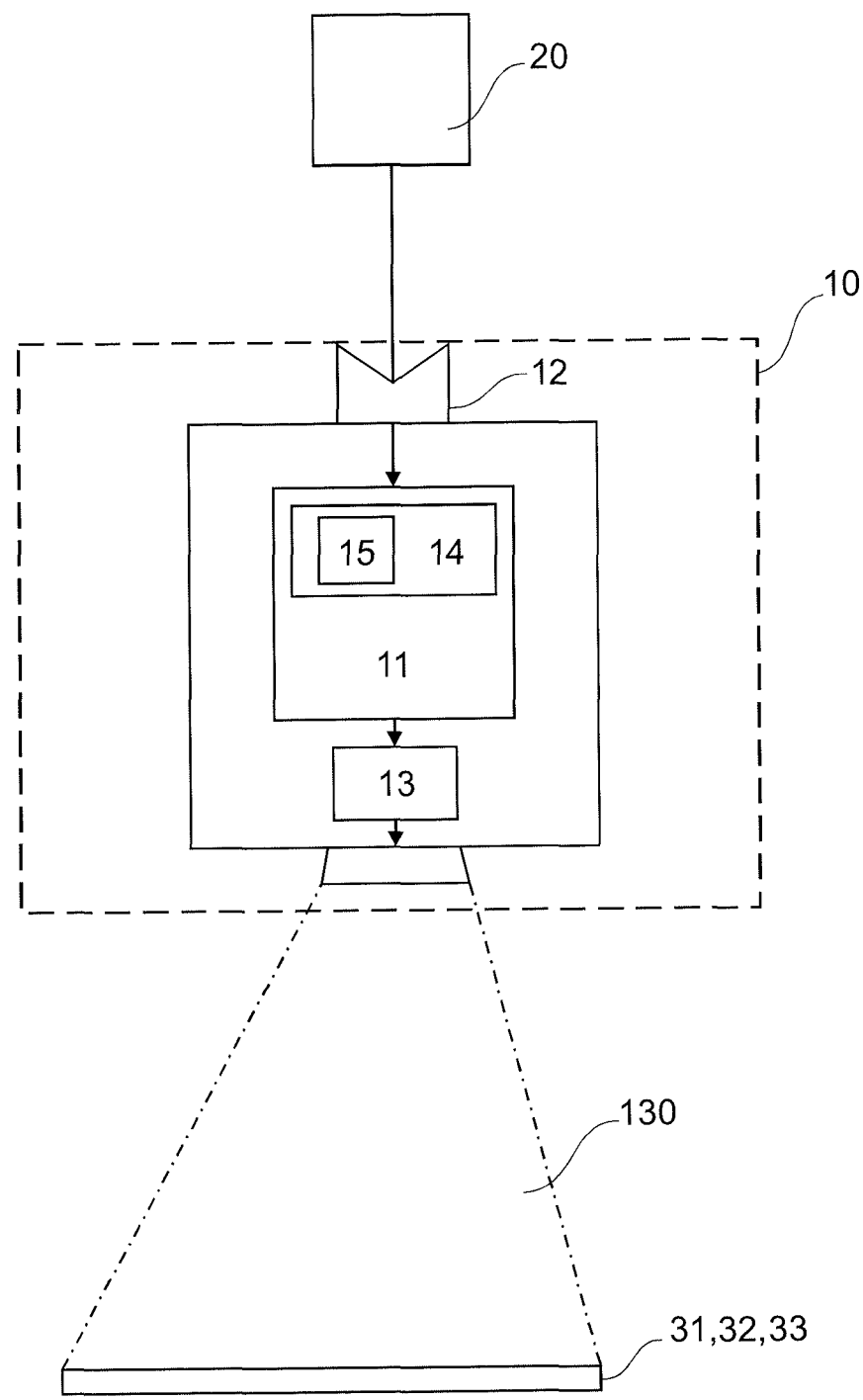
FIG. 4 shows a diagrammatic view of an exemplary embodiment of the lighting device.

FIG. 4 shows a diagrammatic view of a lighting device 10 according to an exemplary embodiment of the invention. The lighting device consists of a lighting unit 13 designed for the locally differentiated illumination of a projection area 31 with a lighting cone 130. The lighting unit 13 is controlled by the control unit 11. A microprocessor 15 integrated into the control unit can use the interface 12 to acquire and process control data, and then control the lighting unit. The interface can be configured as a PSU interface. Further, the interface can be linked with an external system 20. For example, this central system can be the cabin management system.

The lighting device 10 further exhibits a memory unit 15 designed to store different lighting patterns. The control unit can use the received and stored lighting patterns to actuate the lighting unit 13.

Figure 5:
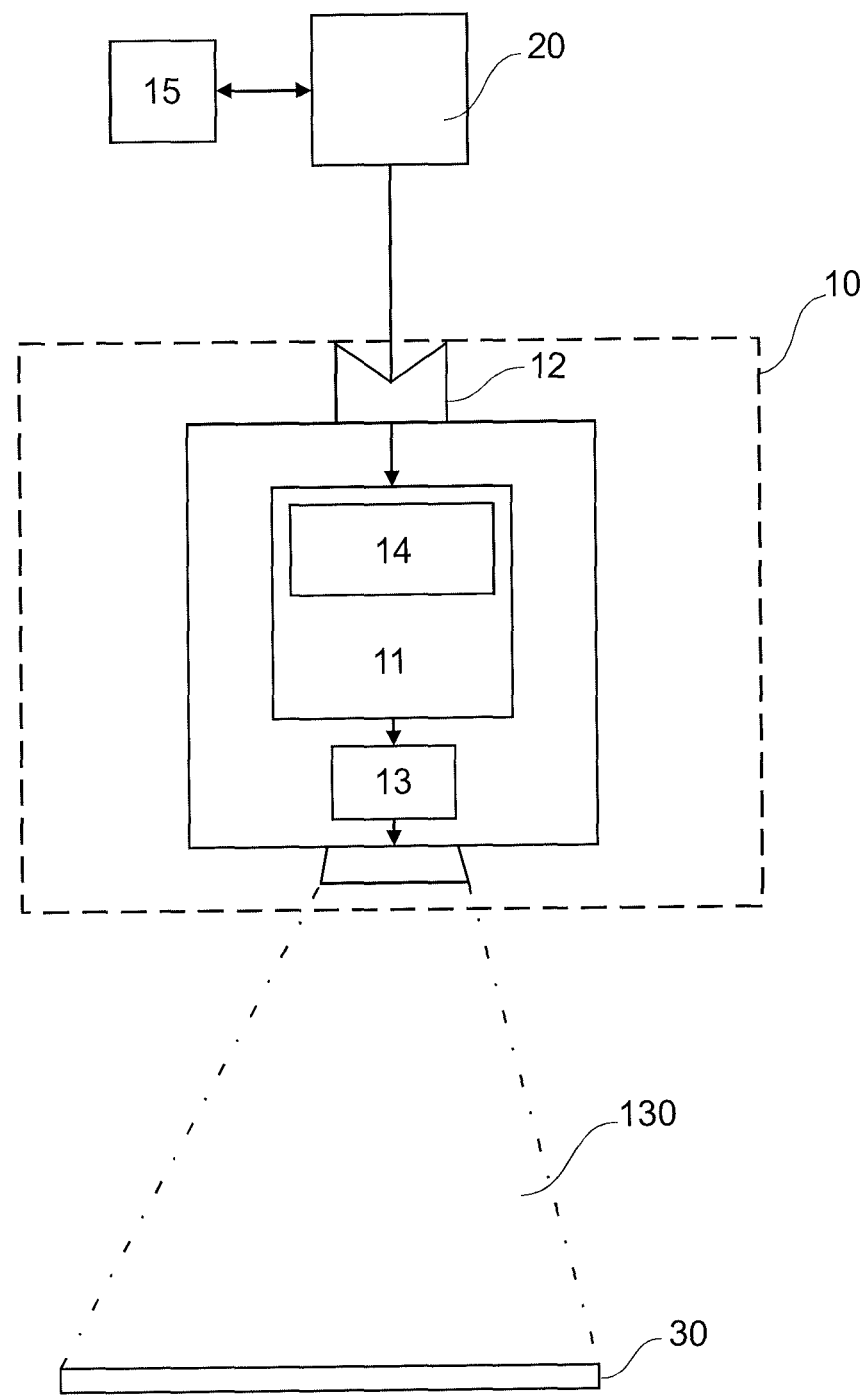
FIG. 5 shows a diagrammatic view of another exemplary embodiment of the lighting device.

FIG. 5 shows a diagrammatic view of another exemplary embodiment of the lighting device 10. In this embodiment, the memory unit 15 is external. In this case, the storage medium with the different lighting patterns and configuration files is linked with the external system 20. The advantage to this is that only a single memory unit 15 is required for a plurality of lighting devices. The lighting units 13a, 13b and 13c can also transmit the status of the "single" lamps to the cabin management system. For example, if no changes are made to the preferences during the flight, and the "default" setting is then reported to the central system as the status, the lighting device does not have to be reset to the default status before the landing phase begins. Another type of information stored in the central system might involve a suitable emergency lighting for emergency situations. In this way, color-coded arrows could denote the prescribed evacuation routes.

Figure 6:
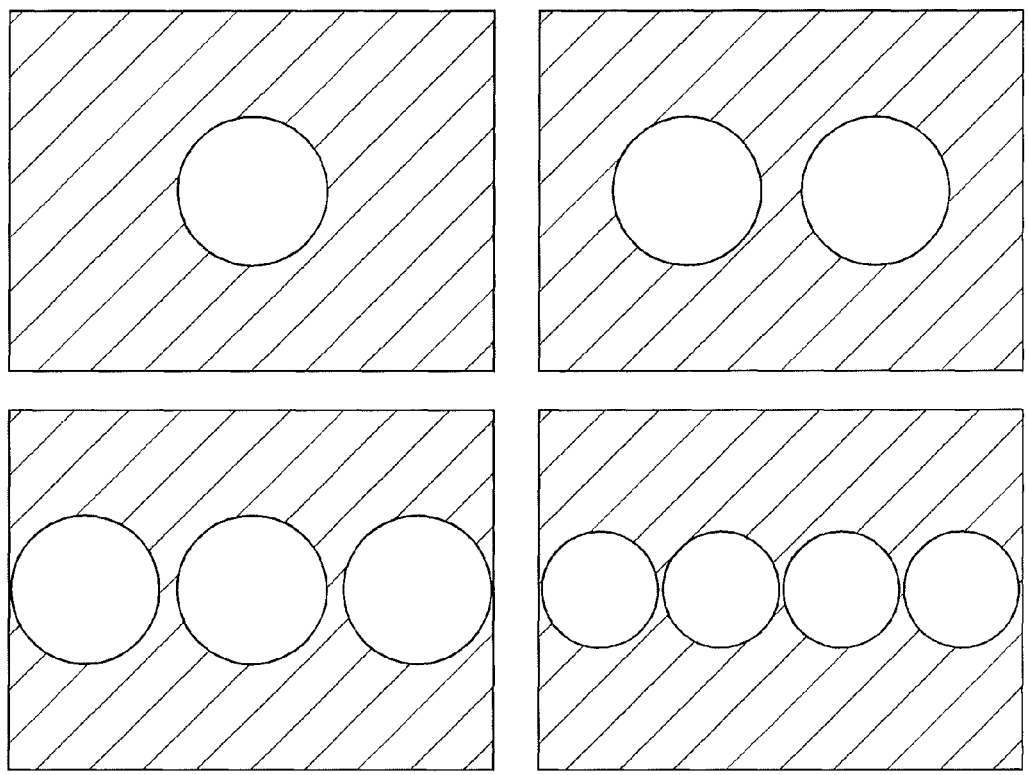
FIG. 6 shows exemplary embodiments of lighting patterns realized by round lighting cones.

FIG. 6 shows exemplary embodiments of lighting patterns. In the depicted cover area (hatched area), up to four circular lighting areas (circular areas) can be realized. If only one lighting cone is specifically used, individual lighting can be ensured for a single passenger. The eyes of the passenger or his/her fellow passengers in adjacent seats must here not be blinded. In addition to using a suitable electronic actuator, this can take place in combination with an anti-glare device.

Figure 7:
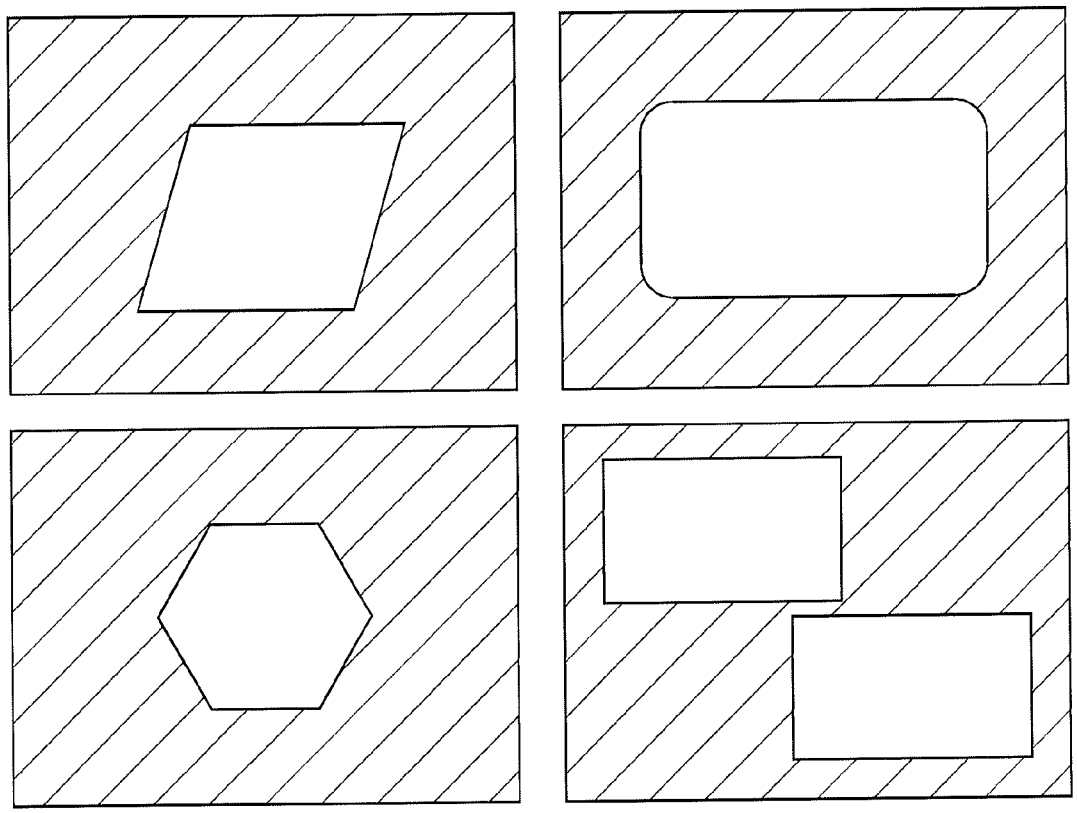
FIG. 7 shows additional exemplary embodiments of lighting patterns.

FIG. 7 diagrammatically shows additional adjustable lighting cones. The numerous types of polygonal shapes, such as parallelograms (rhomboids), rectangles or hexagons, are depicted in the individual secondary figures. In this case, two rectangles can also be offset relative to each other. The adjustable lighting cones depend only on the stored image file, and are hence not limited in terms of possible geometric shapes. However, so that rectangular distortions or inhomogeneous lighting intensities can be precluded for the more remote seats, the image files are tailored accordingly to the respective conditions and seating arrangements.

Figure 8:
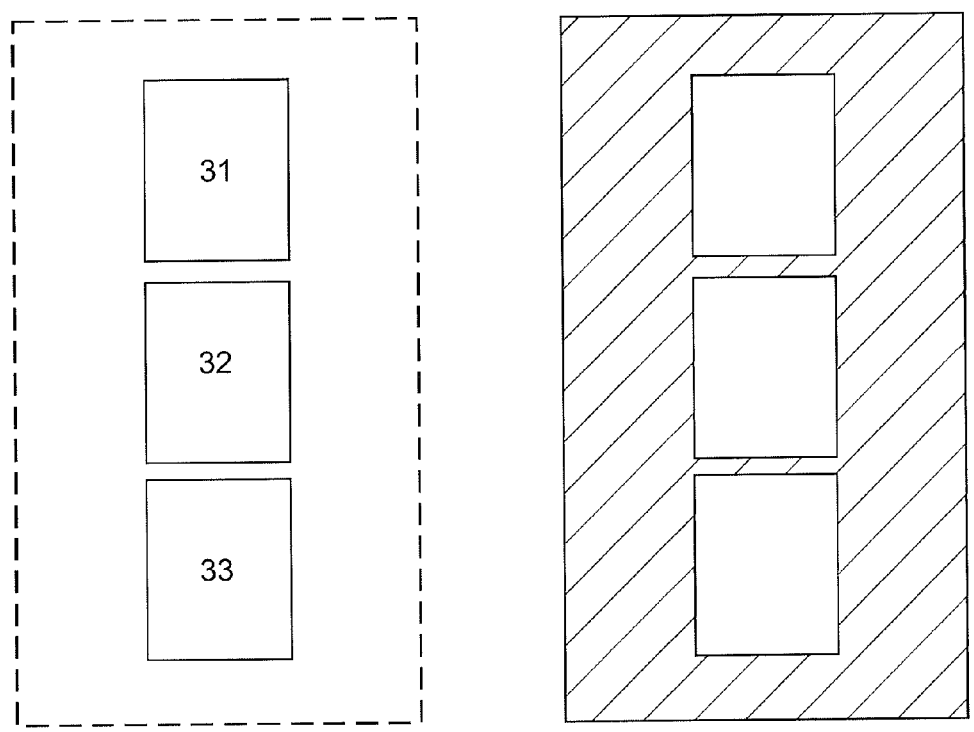
FIG. 8 shows exemplary lighting patterns for illuminating the individual trays for three adjacent seats.

FIG. 8 shows a lighting configuration that is especially suitable once the passengers have folded out the trays of their respective seats. For example, this can be the case at times when service is being provided, and onboard menus and beverages are being handed out. While the cover area of a "single" lighting unit is denoted by the dot-dash line on the left side of FIG. 8, where three trays are shown, the right image depicts the image file provided for this configuration. This makes it possible to optimally illuminate the trays.

Figure 9:
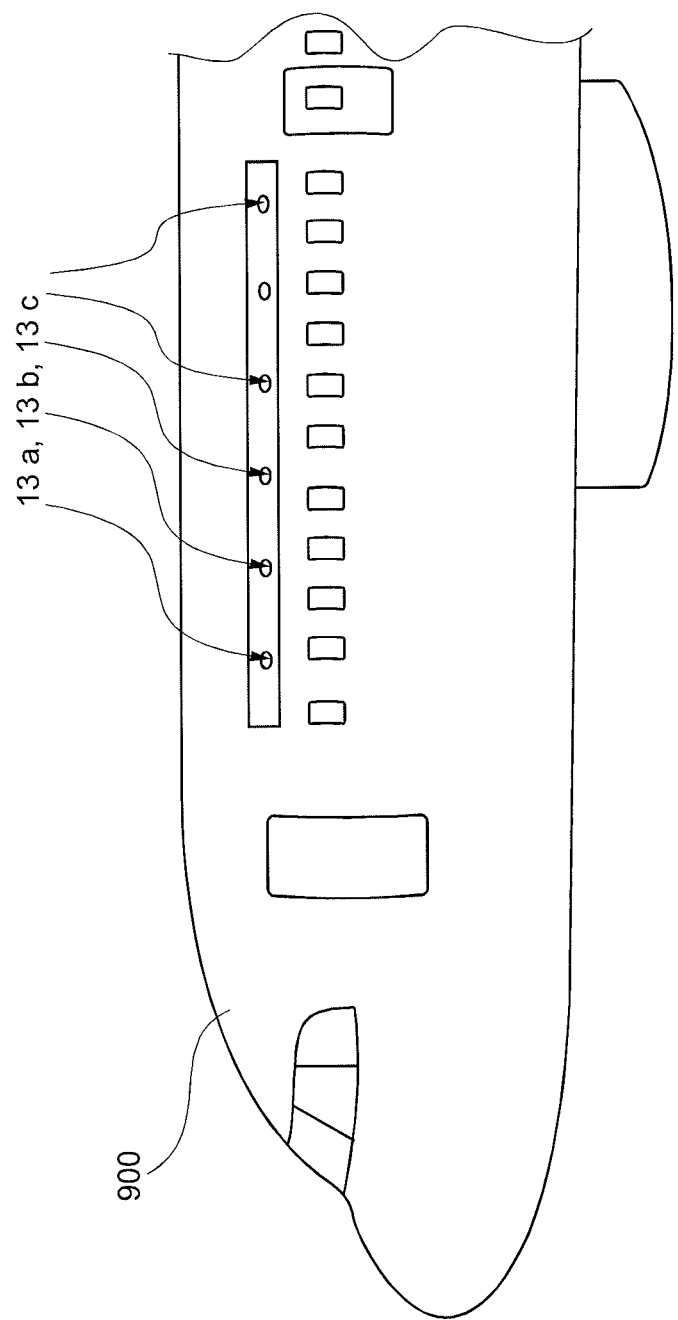
FIG. 9 shows an aircraft with lighting devices according to an exemplary embodiment of the invention.

FIG. 9 shows an aircraft 900 with lighting devices per row of seats 13a, 13b and 13c, which are situated above the passenger seats in the PSU channel. All lighting units can be centrally controlled from a cabin management system (not shown).

Figure 10:
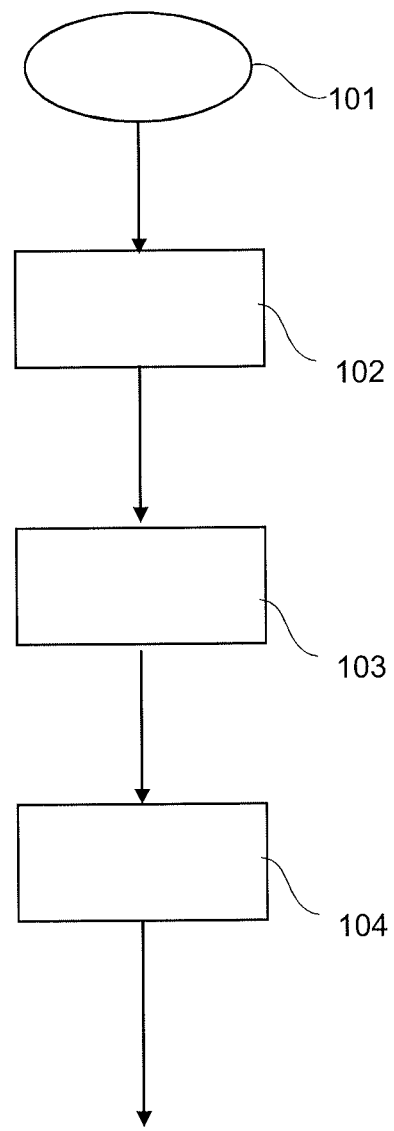
FIG. 10 shows a diagrammatic view of a method for illuminating a projection area.

FIG. 10 shows the procedural steps for illuminating a projection area. Step 101 starts the procedure. In the second procedural step 102, lighting data are sent to an external system via an interface and received. In the next procedural step 102, the lighting unit is actuated by a control unit in relation to the different lighting patterns based on the received lighting data. In the last procedural step 104, the projection area is illuminated by a lighting unit in relation to the different lighting patterns. This makes it possible to realize a plurality of different lighting patterns, and hence replace up to four reading lamps with a single lighting unit.

The invention claimed is:

1. A lighting device for a personal transport vehicle, wherein the lighting device comprises:
   a lighting unit,
   an interface, and
   a control unit,
   wherein the lighting unit is adapted for a varied, locally differentiated illumination of at least one projection area with a corresponding lighting cone based on a plurality of different pixel-based lighting patterns;
   wherein the lighting unit is further adapted to illuminate at least one predetermined area on a projection surface within the projection area while leaving the rest of the projection area unilluminated;
   wherein the lighting device is adapted for projecting the pixel-based lighting patterns based on image data;
   wherein the interface is configured to communicate with an external system for receiving and transmitting lighting data; and
   wherein the control unit is configured to actuate the lighting unit with respect to the different lighting patterns based on the lighting data received by the control unit.

2. The lighting device of claim 1, wherein the lighting device further comprises a memory unit configured to store the plurality of different lighting patterns, wherein the control unit is configured to use the received lighting data and stored lighting patterns as the basis for actuating the lighting unit.

3. The lighting device of claim 1, wherein the control unit is configured to actuate a plurality of opening angles, directions, lighting intensity, colors and/or shapes of illumination.

4. The lighting device of claim 1, wherein the control unit is configured to electronically actuate a plurality of lighting cones.

5. The lighting device of claim 1, wherein the lighting device is a laser projector adapted to write an image file onto a projection surface line by line.

6. The lighting device of claim 1, wherein the lighting unit comprises light sources selected from a group consisting of:
   LED's;
   OLED's;
   fiber optics;
   laser beams; and
   gas discharge lamps.

7. The lighting device of claim 1, wherein the lighting unit further comprises a controllable lens system.

8. The lighting device of claim 1, wherein the lighting unit further comprises an electronically actuatable filter.

9. The lighting device of claim 1, wherein the control unit comprises a multiplexing device designed to repeatedly actuate the lighting unit with respect to a plurality of lighting cones.

10. An aircraft with a lighting device for a personal transport vehicle, wherein the lighting device comprises:
    a lighting unit,
    an interface, and
    a control unit,
    wherein the lighting unit is adapted for a varied, locally differentiated illumination of at least one projection area with a corresponding lighting cone based on a plurality of different pixel-based lighting patterns;
    wherein the lighting unit is further adapted to illuminate at least one predetermined area on a projection surface within the projection area while leaving the rest of the projection area unilluminated;
    wherein the lighting device is adapted for projecting the pixel-based lighting patterns based on image data;
    wherein the interface is configured to communicate with an external system for receiving and transmitting lighting data;
    wherein the control unit is configured to actuate the lighting unit with respect to the different lighting patterns based on the lighting data received by the control unit; and
    wherein the aircraft further comprises a system configured to output lighting data to the interface.

11. A method of illumination with a lighting device, wherein the method comprises the steps of:
    transmitting lighting data from an external system via an interface and receiving the lighting data based on pixel-based image data at a control unit;
    actuating the lighting unit with respect to the different lighting patterns based on the received lighting data by the control unit;
    illuminating a projection area with the lighting cone with a lighting unit relative to the different lighting patterns based on a plurality of different lighting patterns; and
    projecting pixel-based lighting patterns to at least one projection area based on the pixel-based image data, wherein at least one predetermined area on a projection surface within the projection area is illuminated while leaving the rest of the projection area unilluminated.

* * * * *